United States Patent
Irisawa (10) Patent No.: US 9,440,194 B2
(45) Date of Patent: Sep. 13, 2016

(54) EXHAUST GAS PURIFICATION APPARATUS FOR AN INTERNAL COMBUSTION ENGINE

(75) Inventor: Yasuyuki Irisawa, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 113 days.

(21) Appl. No.: 14/408,650

(22) PCT Filed: Jun. 19, 2012

(86) PCT No.: PCT/JP2012/065612
§ 371 (c)(1),
(2), (4) Date: Dec. 17, 2014

(87) PCT Pub. No.: WO2013/190635
PCT Pub. Date: Dec. 27, 2013

(65) Prior Publication Data
US 2015/0174529 A1 Jun. 25, 2015

(51) Int. Cl.
*B01D 50/00* (2006.01)
*B01D 53/94* (2006.01)
(Continued)

(52) U.S. Cl.
CPC ....... *B01D 53/9495* (2013.01); *B01D 53/9431* (2013.01); *B01D 53/9477* (2013.01); *F01N 3/021* (2013.01); *F01N 3/0842* (2013.01); *F01N 3/2066* (2013.01); *F01N 3/2073* (2013.01); *F02D 41/029* (2013.01); *F02D 41/0275* (2013.01); *B01D 53/9409* (2013.01);
(Continued)

(58) Field of Classification Search
CPC . F01N 3/2073; F01N 3/021; B01D 53/9495; B01D 2255/908; B01D 53/9409; Y02T 10/22

USPC ............... 422/168, 50, 83; 60/274, 276, 286
See application file for complete search history.

(56) References Cited

U.S. PATENT DOCUMENTS 6,662,553 B2 * 12/2003 Patchett ................. B01D 53/90
60/274
6,701,707 B1 * 3/2004 Upadhyay ............... F01N 3/208
60/276

(Continued)

FOREIGN PATENT DOCUMENTS

DE 102008022106 A1 11/2008
EP 2063090 A1 5/2009
(Continued)

*Primary Examiner* — Tom P Duong
(74) *Attorney, Agent, or Firm* — Kenyon & Kenyon LLP (57) ABSTRACT

A decrease in the NOx removal or reduction rate is suppressed, while suppressing the outflow of particulate matter from a filter after regeneration of the filter. To this end, in an exhaust passage of an internal combustion engine, there are provided a filter, an NOx storage reduction catalyst, and an NOx selective reduction catalyst which is arranged at the downstream side of the NOx storage reduction catalyst, wherein when a reducing agent is supplied to the NOx storage reduction catalyst or the NOx selective reduction catalyst, rich control in which an air fuel ratio of exhaust gas is controlled to a rich air fuel ratio is carried out, and the lowest value of the air fuel ratio of the exhaust gas, at the time of carrying out the rich control in a predetermined period of time from a point in time at which the regeneration of the filter has ended, is made higher than the lowest value or an average value of the air fuel ratio of the exhaust gas at the time of carrying out the rich control in a period of time from the lapse of the predetermined period of time until when the next regeneration of the filter is carried out.

2 Claims, 3 Drawing Sheets

(51) Int. Cl.
  *F01N 3/08*   (2006.01)
  *F01N 3/20*   (2006.01)
  *F02D 41/02*  (2006.01)
  *F01N 3/021*  (2006.01)
  *F01N 13/00*  (2010.01)

(52) U.S. Cl.
  CPC ..... *B01D53/9445* (2013.01); *B01D 2255/908* (2013.01); *F01N 3/0885* (2013.01); *F01N 13/009* (2014.06); *F02D 2200/0812* (2013.01); *Y02T 10/22* (2013.01); *Y02T 10/24* (2013.01)

(56) References Cited

U.S. PATENT DOCUMENTS

| | | | | |
|---|---|---|---|---|
| 7,610,750 | B2* | 11/2009 | Viola | F01N 3/035 60/277 |
| 7,886,527 | B2* | 2/2011 | Solbrig | F01N 3/106 60/274 |
| 2005/0129601 | A1 | 6/2005 | Li et al. | |
| 2006/0010857 | A1* | 1/2006 | Hu | F01N 13/011 60/286 |
| 2006/0213187 | A1* | 9/2006 | Kupe | B01D 53/9431 60/286 |
| 2006/0254258 | A1* | 11/2006 | Blakeman | B01D 53/9431 60/286 |
| 2007/0175208 | A1* | 8/2007 | Bandl-Konrad | B01D 53/9431 60/286 |
| 2007/0269353 | A1 | 11/2007 | Li et al. | |
| 2007/0294998 | A1 | 12/2007 | Yoshida et al. | |
| 2008/0276602 | A1 | 11/2008 | McCabe et al. | |
| 2008/0289318 | A1 | 11/2008 | Elwart et al. | |
| 2010/0089039 | A1* | 4/2010 | Asanuma | B01D 53/9409 60/286 |
| 2010/0221154 | A1* | 9/2010 | Lee | B01D 53/945 422/177 |

FOREIGN PATENT DOCUMENTS

| | | |
|---|---|---|
| EP | 2184460 A1 | 5/2010 |
| JP | 2004-052680 A | 2/2004 |
| JP | 2004-150389 A | 5/2004 |
| JP | 2006-017083 A | 1/2006 |
| JP | 2007-064055 A | 3/2007 |
| JP | 2007-527314 A | 9/2007 |
| JP | 2007-255289 A | 10/2007 |
| JP | 2008-281005 A | 11/2008 |
| JP | 2009-127559 A | 6/2009 |
| WO | 2006-006031 A1 | 1/2006 |

\* cited by examiner

EXHAUST GAS PURIFICATION APPARATUS FOR AN INTERNAL COMBUSTION ENGINE

CROSS-REFERENCE TO RELATED APPLICATION

This is a national phase application based on the PCT International Patent Application No. PCT/JP2012/065612 filed Jun. 19, 2012, the entire contents of which are incorporated herein by reference.

TECHNICAL FIELD

The present invention relates to an exhaust gas purification apparatus for an internal combustion engine.

BACKGROUND ART

In order to prevent particulate matter (hereinafter, also referred to as PM) in gas discharged or emitted from an internal combustion engine into the atmosphere, a filter for trapping particulate matter may be provided in an exhaust passage of the internal combustion engine. When a large amount of PM is trapped by this filter, there will be a fear that clogging may occur in the filter. On the other hand, by making high the temperature of the filter as well as the concentration of oxygen in the exhaust gas, the PM trapped by the filter can be oxidized, so that the PM can be removed from the filter. The removal of the PM from the filter in this manner is referred to as regeneration of the filter.

Then, there has been known a technology which enhances efficiency at the time of raising the temperature of a filter by inhibiting the regeneration of the filter when the temperature of ambient air is equal to or less than a predetermined value (for example, refer to a first patent literature).

In addition, there has been known a technology in which at the time of regeneration of a filter, NOx is supplied to the filter from an NOx storage reduction catalyst (hereinafter, referred to as an NSR catalyst) which is provided at the upstream side of the filter (for example, refer to a second patent literature). In this technology, oxidation of PM is promoted by NOx. Also, a necessary amount of NOx is caused to be adsorbed to the NSR catalyst in advance before the regeneration of the filter.

Moreover, there has been known a technology in which a three-way catalyst is provided at the downstream side of a filter, so that the air fuel ratio of an exhaust gas is adjusted to be in the vicinity of a stoichiometric air fuel ratio at which NOx is able to be removed or reduced in the three-way catalyst, after which the air fuel ratio is adjusted to be a lean air fuel ratio with which the filter is able to be regenerated (for example, refer to a third patent literature).

Further, there has been known a technology in which a gas of a rich air fuel ratio is supplied to an NSR catalyst in a continuous or intermittent manner until the temperature of the NSR catalyst becomes equal to or less than a threshold value after the regeneration of a filter (for example, refer to a fourth patent literature).

In addition, there has been known a technology in which an amount of PM discharged from an internal combustion engine is decreased by decreasing an amount of EGR gas at the time when an amount of PM trapped by a filter is equal to or less than a predetermined amount, or by decreasing the amount of EGR gas immediately after regeneration of the filter (for example, refer to a fifth patent literature).

However, a filter, an NSR catalyst and an NOx selective reduction catalyst (hereinafter, also referred to as an SCR catalyst) may be provided in an exhaust passage of an internal combustion engine. Here, note that the NSR catalyst serves to occlude or store NOx contained in an incoming exhaust gas when the concentration of oxygen in the incoming exhaust gas is high, and to reduce the occluded or stored NOx when the oxygen concentration of the incoming exhaust gas becomes low and when a reducing agent exists. In addition, the SCR catalyst serves to carry out selective reduction of NOx by means of the reducing agent. Then, by causing the internal combustion engine to operate at a rich air fuel ratio for only a short period of time during the operation of the internal combustion engine at a lean air fuel ratio, $NH_3$ can be made to generate in the NSR catalyst. The $NH_3$ thus generated can be supplied to the SCR catalyst as the reducing agent. In addition, by causing the internal combustion engine to operate at a rich air fuel ratio, HC and CO can be supplied to the NSR catalyst as the reducing agent.

Here, the trapping efficiency of the filter drops immediately after carrying out the regeneration of the filter. This trapping efficiency of the filter is a ratio of an amount of PM trapped by the filter with respect to an amount of PM flowing into the filter. This amount of PM may also be an amount of PM per unit volume, or may also be a concentration of PM. When the amount of PM trapped in the filter is large, a passage in the filter for exhaust gas is narrowed due to the PM thus trapped, so that it is easy for PM to be trapped. On the other hand, by carrying out the regeneration of the filter, the passage in the filter for exhaust gas is enlarged, so that it becomes easy for PM to pass through the filter. In addition, when the internal combustion engine is operated at a rich air fuel ratio in order to supply the reducing agent to the NSR catalyst, the amount of PM discharged from the internal combustion engine will be increased. Accordingly, immediately after the regeneration of the filter, when the internal combustion engine is operated at a rich air fuel ratio, there is a fear that PM may flow out to the downstream side of the filter. However, in cases where a device for supplying a reducing agent into the exhaust passage of the internal combustion engine is not provided, unless the internal combustion engine is operated at a rich air fuel ratio, it becomes impossible to supply the reducing agent to the NSR catalyst and the SCR catalyst, thus making it difficult to reduce NOx.

PRIOR ART REFERENCES

Patent Literatures

[First Patent Literature] Japanese patent laid-open publication No. 2007-255289
[Second Patent Literature] Japanese patent laid-open publication No. 2004-052680
[Third Patent Literature] Japanese patent laid-open publication No. 2009-127559
[Fourth Patent Literature] Japanese patent laid-open publication No. 2008-281005
[Fifth Patent Literature] Japanese patent laid-open publication No. 2004-150389

SUMMARY OF THE INVENTION

Problems to be Solved by the Invention

The present invention has been made in view of the problems as referred to above, and has for its object to suppress a decrease in an NOx removal or reduction rate, while suppressing particulate matter from flowing out from a filter after regeneration of the filter.

Means for Solving the Problems

In order to achieve the above-mentioned object, an exhaust gas purification apparatus for an internal combustion engine according to the present invention includes:

a filter that is arranged in an exhaust passage of the internal combustion engine for trapping particulate matter contained in an exhaust gas;

an NOx storage reduction catalyst that is arranged in the exhaust passage of the internal combustion engine, and serves to store NOx when an air fuel ratio of the exhaust gas is a lean air fuel ratio, and to reduce the NOx thus stored when the air fuel ratio of the exhaust gas is a rich air fuel ratio;

an NOx selective reduction catalyst that is arranged in the exhaust passage at a location downstream of said NOx storage reduction catalyst, and serves to reduce the NOx by using $NH_3$ as a reducing agent;

a regeneration unit that carries out regeneration of the filter to remove the particulate matter from said filter; and a control device that carries out rich control in which the air fuel ratio of the exhaust gas flowing into said NOx storage reduction catalyst is controlled to a rich air fuel ratio, at the time of supplying the reducing agent to said NOx storage reduction catalyst or said NOx selective reduction catalyst;

wherein said control device makes the lowest value of the air fuel ratio of the exhaust gas at the time of carrying out said rich control in a predetermined period of time from a point in time at which the regeneration of said filter has ended, to be an air fuel ration which is more suitable for generating $NH_3$ in said NOx storage reduction catalyst than for reducing NOx in said NOx storage reduction catalyst, and makes the lowest value or an average value of the air fuel ratio of the exhaust gas at the time of carrying out said rich control in a period of time from the lapse of said predetermined period of time until when the next regeneration of the filter is carried out, to be an air fuel ratio which is lower than the lowest value of the air fuel ration of the exhaust gas at the time of carrying out said rich control in said predetermined period of time, and which is more suitable for reducing NOx in said NOx storage reduction catalyst than for generating $NH_3$ in said NOx storage reduction catalyst.

The NOx storage reduction catalyst (NSR catalyst) serves to adsorb or store NOx when the air fuel ratio of the exhaust gas is a lean air fuel ratio, and to reduce the NOx thus stored when the air fuel ratio of the exhaust gas becomes a rich air fuel ratio. In addition, the NSR catalyst generates $NH_3$ at the time of the air fuel ratio of the exhaust gas being a rich air fuel ratio. Here, note that any one of the filter and the NSR catalyst may be arranged at the upstream side of the other. Moreover, the NOx selective reduction catalyst (SCR catalyst) adsorbs $NH_3$, and reduces NOx by means of the $NH_3$.

The regeneration unit, for example, causes the temperature of the filter to go up to a temperature at which the PM trapped by the filter is oxidized, and increases the concentration of oxygen in the exhaust gas by making the air fuel ratio of the exhaust gas flowing into the filter to be a lean air fuel ratio. As a result of this, the PM is oxidized. However, note that there is no limitation to a method of removing the PM from the filter.

The control device changes an air fuel ratio which is used as a target at the time of carrying out rich control, between in the predetermined period of time from the point in time at which the regeneration of the filter has ended, and in a period of time which is later than the predetermined period of time and is until when the next regeneration of the filter is started. The rich control can include control which changes the air fuel ratio of the exhaust gas flowing into. the NOx storage reduction catalyst from a lean air fuel ratio or a stoichiometric air fuel ratio to a rich air fuel ratio.

Here, after the regeneration of the filter, it becomes easy for PM to pass through the filter. Then, when the internal combustion engine is operated at a rich air fuel ratio in order to reduce the NOx having been occluded or stored in the NSR catalyst, the amount of the PM to be discharged from the internal combustion engine will be increased. The higher the degree of richness of the rich air fuel ratio, i.e., the lower the air fuel ratio, the larger becomes the amount of the PM to be discharged from the internal combustion engine at the time of such a rich air fuel ratio. In particular, when the reducing agent is supplied in order to reduce the NOx having been occluded or stored in the NSR catalyst, the air fuel ratio of the exhaust gas is set to a relatively low air fuel ratio at the time of carrying out the rich control, and hence, the amount of discharge of PM is large.

On the other hand, in the NSR catalyst, even if the degree of richness of the air fuel ratio at the time of the rich control is relatively low, $NH_3$ can be generated. That is, an optimal air fuel ratio for generating $NH_3$ in the NSR catalyst in order to reduce NOx in the SCR catalyst is higher than an optimal air fuel ratio for reducing NOx in the NSR catalyst. That is, in the case of reducing NOx in the SCR catalyst, the air fuel ratio at the time of supplying the reducing agent may be higher than that in the case of reducing NOx in the NSR catalyst, and hence, the amount of PM discharged from the internal combustion engine also becomes smaller.

Accordingly, in the predetermined period of time from the point in time at which the regeneration of the filter has ended, $NH_3$ can be supplied to the SCR catalyst, while decreasing the amount of the PM to be discharged from the internal combustion engine, by making relatively high the air fuel ratio of the exhaust gas at the time of the rich control. That is, by reducing NOx mainly in the SCR catalyst, it is possible to suppress a decrease in the removal or reduction rate of NOx, while decreasing the amount of the PM to be discharged from the internal combustion engine.

Here, note that the air fuel ratio of the exhaust gas may be made to change during the rich control. Even in such a case, when the lowest value of the air fuel ratio of the exhaust gas at the time of carrying out rich control in the predetermined period of time from the point in time of the end of the regeneration of the filter is made higher than the lowest value or the average value of the air fuel ratio of the exhaust gas at the time of carrying out rich control in a period of time from the lapse of the predetermined period of time until the next regeneration of the filter is carried out, it is possible to suppress the decrease in the removal or reduction rate of NOx, while decreasing the amount of the PM to be discharged from the internal combustion engine. In addition, in cases where rich control is carried out in the predetermined period of time by making the air fuel ratio of the exhaust gas to be the same as that after the lapse of the predetermined period of time, the predetermined period of time may also be set to a period of time in which the amount of the PM passing through the filter exceeds an allowable range. Moreover, when the air fuel ratio of the exhaust gas is made to be an air fuel ratio which is set so as to reduce NOx in the NSR catalyst at the time of rich control, the predetermined period of time may also be set to a period of time in which the amount of the PM passing through the filter exceeds the allowable range.

In addition, in the present invention, provision may be made for a PM trap amount detection device that serves to detect an amount of the particulate matter trapped by said filter, and said predetermined period of time may be a period of time until the amount of the particulate matter detected by said PM trap amount detection device reaches a predetermined amount.

The predetermined amount referred to herein is an amount of trapped PM in which the amount of the PM passing through the filter falls within the allowable range. That is, the PM discharged from the internal combustion engine deposits on the filter in a gradual manner after the regeneration of the filter has ended, so that the trapping efficiency of the filter becomes high in a gradual manner. Then, if the trapping efficiency of the filter becomes high to a sufficient extent, it becomes possible to trap the PM to be discharged from the internal combustion engine, when the air fuel ratio of the exhaust gas is caused to decrease to such an extent that NOx can be reduced in the NSR catalyst. Thus, if the trapping efficiency of the filter becomes high to a sufficient extent, the air fuel ratio at the time of rich control may be made lower. In addition, the reducing agent can be supplied to the NSR catalyst, and hence, it becomes possible to reduce NOx in both the NSR catalyst and the SCR catalyst, thereby making it possible to increase the rate of NOx reduction as an entire system.

Here, note that the predetermined period of time can also be decided based on the distance of travel of a vehicle with the internal combustion engine mounted thereon or the operating time of the internal combustion engine. In addition, provision may also be made for a sensor that serves to detect an amount of the PM flowing out from the filter, and a period of time until a detected value of the sensor falls into an allowable range may be set as the predetermined period of time.

Effect of the Invention

According to the present invention, it is possible to suppress a decrease in the NOx removal or reduction rate, while suppressing the outflow of particulate matter from a filter after the regeneration of the filter.

MODES FOR CARRYING OUT THE INVENTION

Hereinafter, reference will be made to specific embodiments of an exhaust gas purification apparatus for an internal combustion engine according to the present invention based on the attached drawings.
<First Embodiment>

Figure 1:
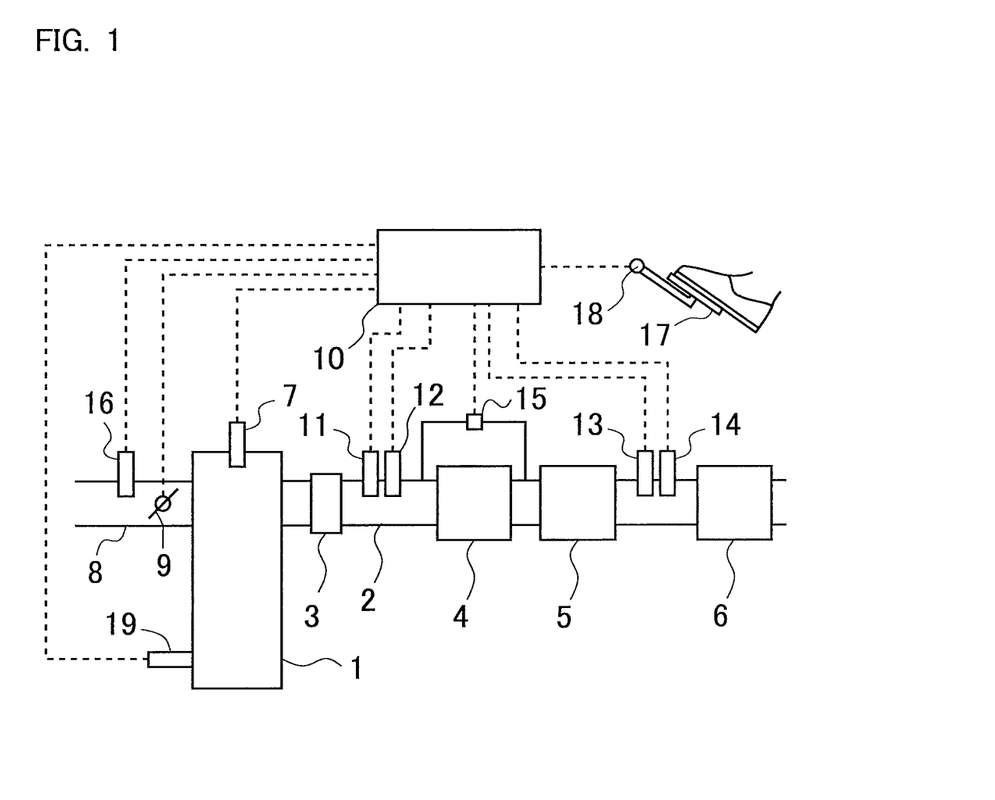
FIG. 1 is a view showing the schematic construction of an internal combustion engine as well as its intake and exhaust systems according to embodiments of the present invention.

FIG. 1 is a view showing the schematic construction of an internal combustion engine as well as its intake and exhaust systems according to embodiments of the present invention. An internal combustion engine 1 shown in FIG. 1 is a gasoline engine, but it may be a diesel engine. The internal combustion engine 1 is installed on a vehicle, for example.

An exhaust passage 2 is connected to the internal combustion engine 1. In the middle of the exhaust passage 2, a three-way catalyst 3, a filter 4, an NOx storage reduction catalyst 5 (hereinafter referred to as an NSR catalyst 5) and an NOx selective reduction catalyst 6 (hereinafter referred to as an SCR catalyst 6) are sequentially provided in this order from an upstream side. Here, note that the filter 4 may be arranged at the downstream side of the NSR catalyst 5, or may be arranged at the downstream side of the SCR catalyst 6.

The three-way catalyst 3 serves to purify or remove NOx, HC and CO with a maximum efficiency at the time when a catalytic atmosphere is at a stoichiometric air fuel ratio. In addition, the three-way catalyst 3 has oxygen storage ability. That is, when the air fuel ratio of an incoming exhaust gas is a lean air fuel ratio, the three-way catalyst 3 occludes or stores an excess of oxygen, whereas when the air fuel ratio of the incoming exhaust gas is a rich air fuel ratio, the three-way catalyst 3 releases or supplies a shortage of oxygen, thereby purifying the exhaust gas.

In addition, the filter 4 traps particulate matter (PM) contained in the exhaust gas. Here, note that a catalyst may be supported on the filter 4. As the particulate matter is trapped by the filter 4, the particulate matter accumulates or deposits on the filter 4 in a gradual manner. Then, by carrying out so-called regeneration of the filter 4 in which the temperature of the filter 4 is raised in a forced manner, the particulate matter deposited on the filter 4 can be oxidized and removed. For example, the temperature of the filter 4 can be raised by supplying HC to the three-way catalyst 3. In addition, instead of providing with the three-way catalyst 3, provision may also be made for other devices which serve to raise the temperature of the filter 4. Moreover, the temperature of the filter 4 may also be raised by causing hot gas to be discharged from the internal combustion engine 1. Further, the temperature of the filter 4 can be raised even by the provision of an oxidation catalyst in place of the three-way catalyst 3.

Moreover, the NSR catalyst 5 serves to occlude or store NOx contained in the incoming exhaust gas when the concentration of oxygen in the incoming exhaust gas is high, and to reduce the occluded or stored NOx when the oxygen concentration of the incoming exhaust gas becomes low and when a reducing agent exists. For the reducing agent to be supplied to the NSR catalyst 5, there can be used HC or CO which is the unburnt fuel to be discharged from the internal combustion engine 1.

The SCR catalyst 6 has adsorbed or stored the reducing agent, and carries out selective reduction of NOx by means of the reducing agent thus adsorbed or stored at the time when NOx passes through the SCR catalyst 6. For the reducing agent to be supplied to the SCR catalyst 6, there can be used the $NH_3$ which is generated in the three-way catalyst 3 or the NSR catalyst 5. Here, when the exhaust gas passes through the three-way catalyst 3 or the NSR catalyst 5, the NOx in the exhaust gas may react with HC or $H_2$ to generate ammonia ($NH_3$).

Further, a first temperature sensor 11 for detecting the temperature of the exhaust gas and an air fuel ratio sensor 12 for detecting the air fuel ratio of the exhaust gas are mounted on the exhaust passage 2 at locations downstream of the three-way catalyst 3 and upstream of the filter 4. Here, note that the temperature of the three-way catalyst 3 or the temperature of the filter 4 can be measured by the first temperature sensor 11. Also, the air fuel ratio of the exhaust gas from the internal combustion engine 1 or the air fuel ratio of the exhaust gas flowing into the filter 4 can be detected by the air fuel ratio sensor 12.

In addition, a second temperature sensor 13 for detecting the temperature of the exhaust gas and an NOx sensor 14 for detecting the concentration of NOx in the exhaust gas are mounted on the exhaust passage 2 at locations downstream of the NSR catalyst 5 and upstream of the SCR catalyst 6. Here, note that the temperature of the NSR catalyst 5 or the temperature of the SCR catalyst 6 can be detected by the second temperature sensor 13. Also, the concentration of NOx or the concentration of $NH_3$ in the exhaust gas flowing into the SCR catalyst 6 can be detected by means of the NOx sensor 14. In addition, based on the concentration of $NH_3$ detected by the NOx sensor 14, an amount of $NH_3$, which is adsorbed by the SCR catalyst 6, can also be calculated.

Here, note that it is not necessary to mount all the above-mentioned sensors, but some of them may be selected and mounted in a suitable manner.

Moreover, on the exhaust passage 2, there is mounted a differential pressure sensor 15 which serves to detect a difference between the pressure therein upstream of the filter 4 and the pressure therein downstream of the filter 4. By means of this differential pressure sensor 15, it is possible to detect an amount of PM which has been trapped in the filter 4 (hereinafter, also referred to as an amount of trapped PM).

Further, on the internal combustion engine 1, there is mounted a fuel injection valve 7 for supplying fuel to the internal combustion engine 1.

On the other hand, an intake passage 8 is connected to the internal combustion engine 1. A throttle valve 9 for adjusting an amount of intake air in the internal combustion engine 1 is arranged in the middle of the intake passage 8. Also, an air flow meter 16 for detecting the amount of intake air in the internal combustion engine 1 is mounted on the intake passage 8 at a location upstream of the throttle valve 9.

In the internal combustion engine 1 constructed as stated above, there is arranged in combination therewith an ECU 10 which is an a control device for controlling the internal combustion engine 1. This ECU 10 controls the internal combustion engine 1 in accordance with the operating conditions of the internal combustion engine 1 and/or driver's requirements.

In addition, besides the above-mentioned sensors, an accelerator opening sensor 18, which serves to detect an engine load by outputting an electrical signal corresponding to an amount of depression by which a driver depressed an accelerator pedal 17, and a crank position sensor 19, which serves to detect the number of revolutions per unit time of the engine, are connected to the ECU 10 through electrical wiring, and the output signals of these variety of kinds of sensors are inputted to the ECU 10.

On the other hand, the injection valve 7 and the throttle valve 9 are connected to the ECU 10 through electrical wiring, so that the opening and closing timing of the injection valve 7 and the degree of opening of the throttle valve 9 are controlled by means of the ECU 10.

For example, the ECU 10 controls the injection valve 7 in such a manner that the injection valve 7 supplies an amount of fuel injection in accordance with the amount of intake air which is detected by the air flow meter 16. The relation between the amount of intake air and the amount of fuel injection has been beforehand obtained through experiments, etc., made into a map, and stored in the ECU 10. The air fuel ratio set at this time is hereinafter referred to as an ordinary air fuel ratio. The word "ordinary" means a time in which the regeneration of the filter 4 and the recovery of sulfur poisoning of the NSR catalyst 5 are not carried out. This ordinary air fuel ratio is an air fuel ratio which is set according to the operating state of the internal combustion engine 1. In addition, in the internal combustion engine 1 according to this embodiment, a lean burn operation is carried out, and hence, the ordinary air fuel ratio is a lean air fuel ratio. Here, note that in this embodiment, the air fuel ratio of the exhaust gas flowing into the NSR catalyst 5 is the same as an air fuel ratio in a combustion chamber of the internal combustion engine 1.

Moreover, the ECU 10 carries out a reduction treatment for the NOx having been occluded or stored in the NSR catalyst 5. At the time of reducing the NOx having been occluded or stored in the NSR catalyst 5, rich control is carried out in which the air fuel ratio of the exhaust gas flowing into the NSR catalyst 5 is caused to decrease to a predetermined rich air fuel ratio only in a short period of time by adjusting the amount of fuel to be injected from the injection valve 7 or the degree of opening of the throttle valve 9. At this time, the amount of intake air or the amount of fuel injection is adjusted so that the air fuel ratio of the exhaust gas becomes 12.5, for example. This air fuel ratio is an air fuel ratio suitable for reducing NOx in the NSR catalyst 5. Here, note that in the rich control, so-called rich spike is carried out.

This rich control is carried out in cases where the amount of NOx having been occluded or stored in the NSR catalyst 5 becomes a predetermined amount. The amount of NOx having been occluded or stored in the NSR catalyst 4 is calculated, for example, by integrating a difference between the amount of NOx flowing into the NSR catalyst 5 and the amount of NOx flowing out of the NSR catalyst 5. The amount of NOx flowing into the NSR catalyst 5 and the amount of NOx flowing out of the NSR catalyst 5 can be detected, for example, by sensors. In addition, the rich control may be carried out at every predetermined period of time or at every predetermined distance of travel.

In addition, the ECU 10 causes $NH_3$ to be adsorbed to the SCR catalyst 6 so that NOx is reduced in the SCR catalyst 6. Then, the rich control is carried out in order to cause $NH_3$ to be adsorbed to the SCR catalyst 6. At this time, the amount of intake air or the amount of fuel injection is adjusted so that the air fuel ratio of the exhaust gas becomes a value from 13.5 to 14.5, for example. This air fuel ratio is suitable for the generation of $NH_3$ in the NSR catalyst 5. For example, the CO in the exhaust gas changes into $H_2$ by a water gas shift reaction or steam reforming reaction, and then the $H_2$ reacts with NO thereby to generate $NH_3$. Thus, the exhaust gas may be adjusted to an air fuel ratio at which this reaction is most promoted. In addition, this air fuel ratio is higher than an air fuel ratio (e.g., 12.5) suitable for the reduction of NOx.

The $NH_3$ generated in this manner has been caused to be adsorbed to the SCR catalyst 6. With this, the NOx not having been reduced in the NSR catalyst 5 can be removed or reduced in the SCR catalyst 6. Thus, by reducing NOx in the NSR catalyst 5 and the SCR catalyst 6, the rate of NOx reduction can be made high.

Moreover, the ECU 10 carries out the regeneration of the filter 4 in which the PM trapped in the filter 4 is removed. In this regeneration of the filter 4, the temperature of the filter 4 is caused to rise to a temperature at which the PM is oxidized, and thereafter, the air fuel ratio of the exhaust gas is adjusted to be a predetermined lean air fuel ratio. Here, note that in this embodiment, the ECU 10, which carries out the regeneration of the filter 4, corresponds to a regeneration unit in the present invention.

The regeneration of the filter 4 is carried out when the amount of the PM trapped in the filter 4 (the amount of the trapped PM) becomes equal to or larger than a threshold value. The amount of the trapped PM can be detected by means of the differential pressure sensor 15. In addition, the amount of the PM flowing into the filter 4, the number of engine revolutions per unit time and the engine load are in a correlation, and so, the amount of PM calculated from the number of engine revolutions per unit time and the engine load may have been integrated, and when an integrated value thus obtained reaches a predetermined amount, the regeneration of the filter 4 may be carried out. Moreover, the regeneration of the filter 4 may be carried out, each time the vehicle with the internal combustion engine 1 mounted thereon travels a predetermined distance.

However, immediately after the regeneration of the filter 4 has been carried out, a passage in the filter 4 for exhaust gas is enlarged by the removal of PM from the filter 4. For this reason, it becomes difficult for PM to be trapped. As a result, the trapping efficiency of PM decreases. For this reason, immediately after the regeneration of the filter 4, it is preferable that the amount of the PM to be discharged from the internal combustion engine 1 be small. That is, if the amount of the PM to be discharged from the internal combustion engine 1 is small, the amount of the PM passing through the filter 4 will also decrease, and hence, the amount of the PM to be released into the atmosphere can be decreased.

On the other hand, when rich control is carried out in order to supply the reducing agent to the NSR catalyst 5 or the SCR catalyst 6, the internal combustion engine 1 will be operated at a rich air fuel ratio, so that the amount of the PM to be discharged from the internal combustion engine 1 increases. Accordingly, when the rich control is carried out immediately after the regeneration of the filter 4, there is a fear that the amount of the PM passing through the filter 4 may become large. However, if the rich control is not carried out, there is a fear that the amount of discharge of the PM can be decreased, but the removal or reduction rate of NOx may become low. That is, when the rate of NOx reduction is intended to be made high, there is a fear that the amount of the PM passing through the filter 4 may increase, whereas when the amount of the PM passing through the filter 4 is intended to be decreased, there is a fear that the rate of NOx reduction may become low.

Accordingly, in this embodiment, the ECU 10 makes the air fuel ratio of the exhaust gas at the time of carrying out the rich control in a predetermined period of time from a point in time at which the regeneration of the filter 4 has ended, lower than the lowest value or an average value of the air fuel ratio of the exhaust gas at the time of carrying out the rich control in a period of time from the lapse of the predetermined period of time until when the next regeneration of the filter 4 is carried out. By doing in this manner, rich control is carried out so as to mainly reduce NOx in the SCR catalyst 6 in the predetermined period of time from the point in time at which the regeneration of the filter 4 has ended. This can be said that in the predetermined period of time from the point in time at which the regeneration of the filter 4 has ended, it is inhibited that the execution of the rich control at an optimal air fuel ratio is carried out so as to reduce NOx in the NSR catalyst 5.

Here, note that such a comparison of the air fuel ratio of the exhaust gas with the lowest value or the average value is because the air fuel ratio may be caused to change in the course of the rich control. The amount of the PM to be discharged from the internal combustion engine 1 can be made to decrease by making the air fuel ratio of the exhaust gas higher than these values.

Here, the higher the degree of richness of the rich air fuel ratio, i.e., the lower the air fuel ratio, the larger becomes the amount of the PM to be discharged from the internal combustion engine 1 at the time of carrying out the rich control. Then, when the rate of NOx reduction in the NSR catalyst 5 is intended to be made high, the air fuel ratio of the exhaust gas has to be decreased to 12.5. On the other hand, when the reducing agent is intended to be supplied to the SCR catalyst 6, the air fuel ratio of the exhaust gas need only to be adjusted to 13.5, for example. Accordingly, when the air fuel ratio of the exhaust gas flowing into the NSR catalyst 5 is made high within a rich range in which the air fuel ratio is rich, there is a fear that the rate of NOx reduction may become low in the NSR catalyst 5, but the reducing agent can be supplied to the SCR catalyst 6, so a decrease in the NOx removal or reduction rate as an entire system can be suppressed. Then, the amount of the PM to be discharged from the internal combustion engine 1 can be made to decrease by making the air fuel ratio of the exhaust gas higher, and so the amount of the PM passing through the filter 4 can be decreased.

Here, note that when the air fuel ratio of the exhaust gas flowing into the NSR catalyst 5 is made high at the time of rich control, there is a fear that the NOx released from the NSR catalyst 5 may flow to the downstream side thereof, while not being reduced. However, at the same time, the reducing agent can be supplied to the SCR catalyst 6, so that the NOx released from the NSR catalyst 5 can also be reduced in the SCR catalyst 6.

Figure 2:
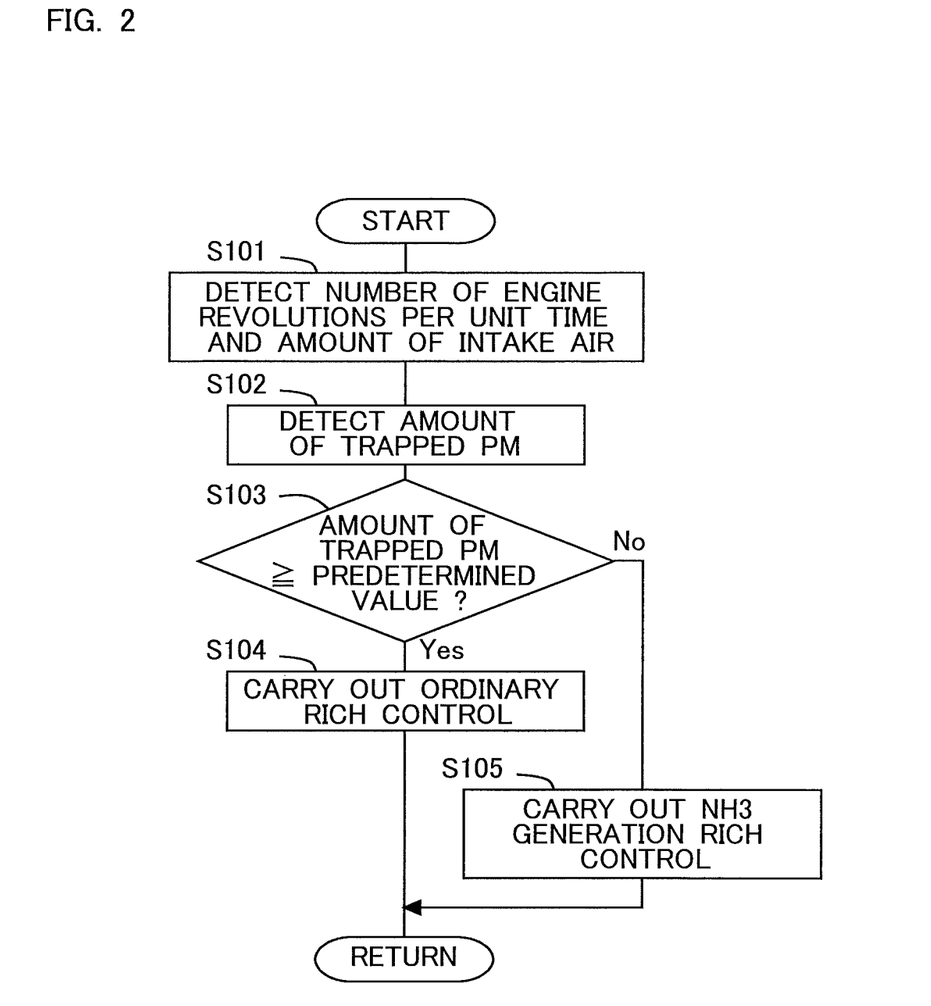
FIG. 2 is a flow chart showing a flow for rich control according to a first embodiment.

FIG. 2 is a flow chart showing a flow or routine for rich control according to this first embodiment. This routine is carried out by means of the ECU 10 at each predetermined time interval.

In step S101, the number of engine revolutions per unit time and the amount of intake air are detected. In this step, values required for calculating an operating region of the internal combustion engine 1 are obtained. For example, these values are used in order to provide a desired air fuel ratio at the time of rich control. The number of engine revolutions per unit time is obtained by the crank position sensor 19. In addition, the amount of intake air is obtained by the air flow meter 16. In this connection, note that in place of the amount of intake air, other physical quantities may be detected which are in correlation with the load of the internal combustion engine 1. When the processing of step S101 is completed, the routine goes to step S102.

In step S102, the amount of the PM trapped in the filter 4 is detected. This amount of the PM can be obtained by means of the differential pressure sensor 15. For example, the relation among the amount of intake air detected in step S101, the value of the differential pressure sensor 15 and the amount of the PM trapped in the filter 4 has been obtained in advance through experiments, etc., and made into a map, and stored in the ECU 10. When the processing of step S102 is completed, the routine goes to step S103.

In step S103, it is determined whether the amount of the PM trapped in the filter 4 is equal to or larger than a predetermined value. The predetermined value referred to herein is a lower limit value of the amount of trapped PM with which the amount of the PM passing through the filter 4 becomes within an allowable range even if rich control is carried out with the air fuel ratio of the exhaust gas being set to an optimal air fuel ratio (e.g., 12.5) most suitable for the reduction of NOx in the NSR catalyst 5. Thus, the rich control, in which the optimal air fuel ratio of the exhaust gas is made to be the optimal air fuel ratio most suitable for the reduction of NOx in the NSR catalyst 5, is hereinafter referred to as "ordinary rich control". In this step, it is determined whether a predetermined period of time has elapsed from the point in time at which the regeneration of the filter 4 has ended. That is, this predetermined period of time is a period of time until the amount of the PM trapped in the filter 4 becomes equal to or larger than the predetermined value.

Here, note that in step S103, it may be determined whether the amount of the PM passing through the filter 4 is equal to or less than a predetermined value. For example, a sensor for detecting the amount of the PM contained in the exhaust gas may be arranged at the downstream side of the filter 4, wherein when the detected value of this sensor becomes equal to or less than a predetermined value, a determination may be made that the amount of the PM passing through the filter 4 has fallen within the allowable range. In addition, in this step, it may be determined whether the distance of travel of the vehicle from the point in time at which the regeneration of the filter 4 has ended has become equal to or larger than a predetermined value, or it may also be determined whether the operating time of the internal combustion engine 1 has become equal to or larger than a predetermined value. These predetermined values referred to herein have each been obtained, through experiments, etc., as a value at which the amount of the PM passing through the filter 4 becomes within the allowable range even if rich control is carried out with the air fuel ratio of the exhaust gas being set to the optimal air fuel ratio most suitable for the reduction of NOx in the NSR catalyst 5. In addition, the above-mentioned predetermined period of time may be set based on an output value of the differential pressure sensor 15. That is, a period of time until the output value of the differential sensor 15 falls into an allowable range may be set as the predetermined period of time. Moreover, the above-mentioned predetermined period of time may be set based on the concentration of the PM in the exhaust gas having passed through the filter 4. That is, provision may also be made for a sensor that serves to detect the concentration of the PM in the exhaust gas having flowed through the filter 4, and a period of time until a detected value of this sensor falls into an allowable range may be set as the predetermined period of time. Then, in cases where an affirmative determination is made in step S103, the routine goes to step S104, and on the other hand, in cases where a negative determination is made, the routine goes to step S105.

In step S104, ordinary rich control is carried out. In this step, the air fuel ratio of the exhaust gas at the time of carrying out rich control in a period of time from the lapse of the predetermined period of time until when the next regeneration of the filter 4 is carried out is determined. Here, note that at the time of carrying out rich control in order to cause $NH_3$ to be generated in the NSR catalyst 5, the air fuel ratio of the exhaust gas is made higher than in the ordinary rich control. In this connection, note that the rich control, in which the air fuel ratio of the exhaust gas is made most suitable for the generation of $NH_3$ in the NSR catalyst 5, is hereinafter referred to as "$NH_3$ generation rich control". When the processing of step S104 is completed, this routine is ended.

On the other hand, in step S105, $NH_3$ generation rich control is carried out. The $NH_3$ generation control is carried out by making the air fuel ratio of the exhaust gas equal to or less than the stoichiometric air fuel ratio (e.g., 13.5). As a result of this, $NH_3$ as the reducing agent is adsorbed to the SCR catalyst 6. In addition, the $NH_3$ generation rich control may be carried out only for a period of time in which the largest amount of $NH_3$, which is able to be adsorbed to the SCR catalyst 6, is generated. Here, note that in this step, the ordinary rich control is not carried out.

The air fuel ratio of the exhaust gas to be set at the time of the $NH_3$ generation rich control is lower than the lowest value or the average value of the air fuel ratio of the exhaust gas at the time of carrying out the ordinary rich control. Here, the air fuel ratio for increasing the rate of NOx reduction in the SCR catalyst 6 is higher than the air fuel ratio of the exhaust gas for increasing the rate of NOx reduction in the NSR catalyst 5. Then, in cases where the amount of trapped PM is less than the predetermined value, the amount of the PM to be discharged from the internal combustion engine 1 can be decreased by carrying out the $NH_3$ generation rich control so as to increase the rate of NOx reduction in the SCR catalyst 6. When the processing of step S105 is completed, this routine is ended.

In this manner, by making the air fuel ratio of the exhaust gas at the time of carrying out the rich control in the predetermined period of time from the point in time at which the regeneration of the filter 4 has ended, lower than the lowest value or the average value of the air fuel ratio of the exhaust gas at the time of carrying out the rich control in the period of time from the lapse of the predetermined period of time until when the next regeneration of the filter 4 is carried out, it is possible to decrease the amount of the PM passing through the filter 4, while reducing NOx in the SCR catalyst 6 in the predetermined period of time from the point in time at which the regeneration of the filter 4 has ended. That is, it is possible to suppress a decrease in the NOx removal or reduction rate as the entire system, while suppressing the outflow of PM from the filter 4 after the regeneration of the filter 4.

Here, note that in this embodiment, the air fuel ratio at the time of the rich control is made relatively high only within the predetermined period of time from the point in time at which the regeneration of the filter 4 has ended, but besides this, when the filter 4 is in a state where PM is able to easily pass through the filter 4, the air fuel ratio at the time of the rich control may also be made relatively high. For example, in cases where the PM deposited on the filter 4 exfoliates from the filter 4, too, it becomes easy for the PM to pass through the filter 4, and hence, the air fuel ratio at the time of the rich control may also be made relatively high. For example, if a differential pressure between an upstream side and a downstream side of the filter 4 obtained by the differential pressure sensor 15 is equal to or less than a threshold value, it is assumed that PM passes through the filter 4, and the air fuel ratio at the time of the rich control may also be made relatively high.

In addition, at the time of carrying out $NH_3$ generation rich control in the predetermined period of time from the point in time at which the regeneration of the filter 4 has ended, the air fuel ratio of the exhaust gas may also be made higher than at the time of carrying out $NH_3$ generation rich control thereafter. As a result of this, the amount of discharge of PM can be further decreased, though the amount of generation of $NH_3$ becomes small. Moreover, even in the $NH_3$ generation rich control, in order to quickly release the oxygen stored in the NSR catalyst 5 in the early stage of the start of the rich control, the air fuel ratio may be set to 12.5, and after the oxygen has been released, the air fuel ratio may be set to 13.5. The lowest value of the air fuel ratio in this case becomes 12.5, and the average value of the air fuel ratio becomes a value which is higher than 12.5 and lower than 13.5. Here, note that in the predetermined period of time from the point in time at which the regeneration of the filter 4 has ended, in order to quickly release the oxygen stored in the NSR catalyst 5, the control to set the air fuel ratio to 12.5 may be inhibited, and the air fuel ratio may be set to 13.5 from the early stage of the start of the rich control.

Further, the air fuel ratio at the time of the rich control may be made lower as the time elapses from the point in time at which the regeneration of the filter 4 has ended. In addition, the air fuel ratio at the time of the rich control may be made lower as the amount of the PM trapped by the filter 4 becomes larger. In this manner, by making the degree of richness of the air fuel ratio higher in accordance with the smaller amount of the PM which can pass through the filter 4, it is possible to make higher the removal or reduction rate of NOx in a gradual manner, while suppressing the PM from passing through the filter 4.

Moreover, although rich control is also carried out when the sulfur poisoning of the NSR catalyst 5 is recovered, the air fuel ratio at this time may also be made relatively high in the predetermined period of time from the point in time at which the regeneration of the filter 4 has ended.

<Second Embodiment>

In this second embodiment, before carrying out $NH_3$ generation rich control, rich control for causing NOx to be released from the NSR catalyst 5 is carried out. At this time, in order to decrease the amount of the PM to be discharged from the internal combustion engine 1, the air fuel ratio of the exhaust gas is made higher than that at the time of the above-mentioned ordinary rich control, and in order to promote the release of NOx from the NSR catalyst 5, the air fuel ratio of the exhaust gas is made lower than that at the time of the above-mentioned $NH_3$ generation rich control. Thus, the rich control for causing NOx to be released from the NSR catalyst 5 is hereinafter referred to as "weak rich control". The other devices, parts and so on are the same as those in the first embodiment, so the explanation thereof is omitted.

Here, when the above-mentioned $NH_3$ generation rich control is carried out in order to generate $NH_3$ in the NSR catalyst 5 after the regeneration of the filter 4, the NOx having been stored in the NSR catalyst 5 will be released. Then, at this time, the reducing agent is short or insufficient due to the low degree of richness of the air fuel ratio, so that the NOx released from the NSR catalyst 5 flows to the downstream side thereof, while not being reduced. At this time, the amount of $NH_3$ having been absorbed by the SCR catalyst 6 is small, and hence, in cases where the amount of the NOx flowing out from the NSR catalyst 5 is large, it also becomes difficult for the NOx to be reduced in the SCR catalyst 6.

On the other hand, by carrying out the weak rich control in which the NOx having been occluded or stored in the NSR catalyst 5 is released, before carrying out the $NH_3$ generation rich control, at least a part of the NOx can be reduced. At this time, because the air fuel ratio of the exhaust gas is higher than that at the time of the ordinary rich control, the amount of the PM to be discharged from the internal combustion engine 1 can be decreased.

Figure 3:
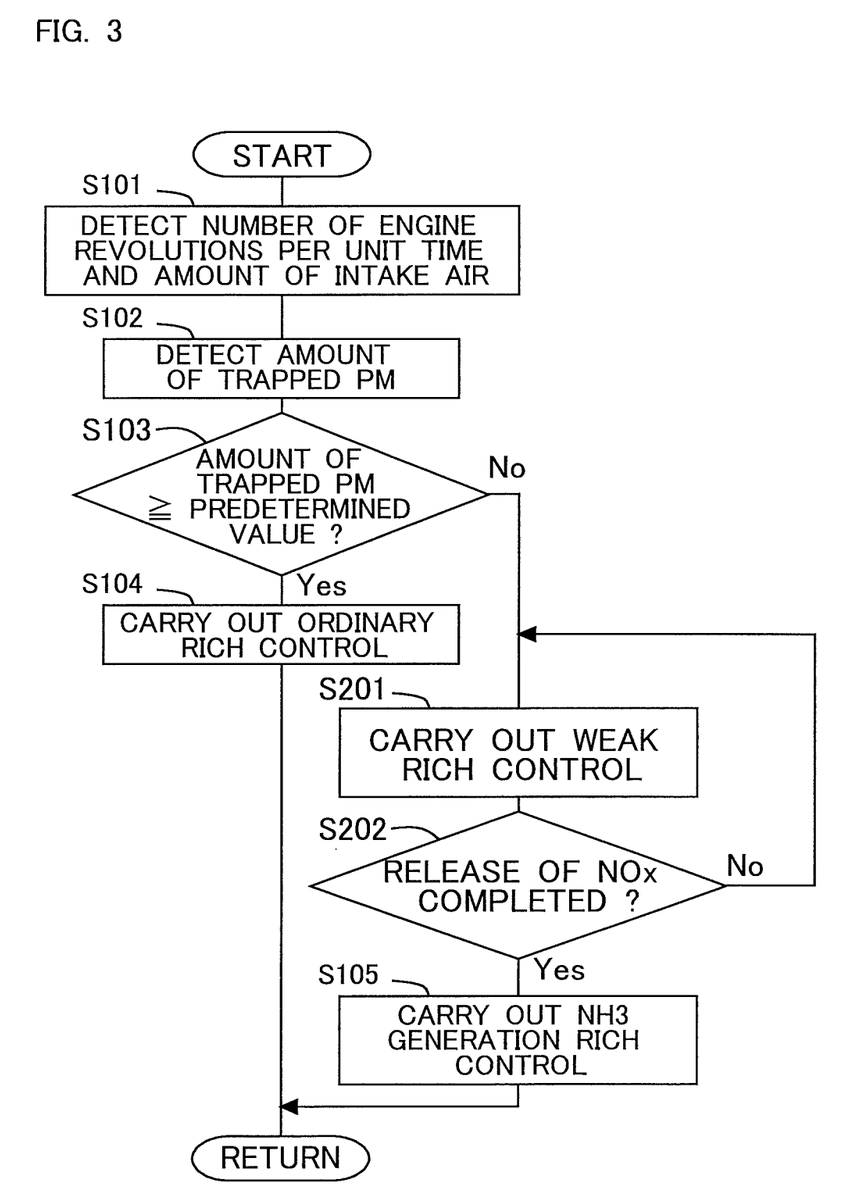
FIG. 3 is a flow chart showing a flow for rich control according to a second embodiment.

Next, FIG. 3 is a flow chart showing a flow or routine for rich control according to this second embodiment. This routine is carried out by means of the ECU 10 at each predetermined time interval. Here, note that for those steps in which the same processing as in the flow shown in FIG. 2 is carried out, the same symbols are attached and an explanation thereof is omitted.

In this routine, when a negative determination is made in step S103, the routine goes to step S201. In step S201, the weak rich control to release NOx from the NSR catalyst 5 is carried out. The air fuel ratio of the exhaust gas at this time is made to be lower than an air fuel ratio at the time of the $NH_3$ generation rich control (e.g., 13.5), and at the same time is made to be higher than an air fuel ratio at the time of the ordinary rich control (e.g., 12.5). When the processing of step S201 is completed, the routine goes to step S202.

In step S202, it is determined whether the release of NOx from the NSR catalyst 5 has been completed. For example, the concentration of the NOx in the exhaust gas flowing out from the NSR catalyst 5 is detected by the NOx sensor 14, and when this detected value becomes equal to or less than a predetermined value which is a value with which it is assumed that the release of NOx from the NSR catalyst 5 has been completed, a determination is made that the release of NOx from the NSR catalyst 5 has been completed.

Here, note that in step S202, it may be determined whether the release of NOx from the NSR catalyst 5 has been started. That is, it may be determined whether it is after all the oxygen having been stored in the NSR catalyst 5 has been released. By causing the oxygen having been stored in the NSR catalyst 5 to be released in the weak rich control, and thereafter shifting therefrom to the $NH_3$ generation rich control, a period of time to be taken for the generation of $NH_3$ can be shortened. For example, as long as oxygen has been stored in the NSR catalyst 5, the air fuel ratio of the exhaust gas at the downstream side of the NSR catalyst 5 becomes the stoichiometric air fuel ratio, but when all the oxygen having been stored in the NSR catalyst 5 is released, the air fuel ratio at the downstream side of the NSR catalyst 5 becomes a rich air fuel ratio. Accordingly, by arranging an air fuel ratio sensor at the downstream side of the NSR catalyst 5, and detecting a change in the air fuel ratio, it can be determined whether all the oxygen having been stored in the NSR catalyst 5 has been released. In cases where an affirmative determination is made in step S202, the routine goes to step S105, whereas in cases where a negative determination is made, the routine returns to step S201, in which the weak rich control from the NSR catalyst 5 is continued.

As described above, according to this second embodiment, it is possible to suppress a decrease in the NOx removal or reduction rate as the entire system, while suppressing the outflow of PM from the filter 4 after the regeneration of the filter 4.

EXPLANATION OF REFERENCE NUMERALS AND CHARACTERS 1 internal combustion engine
2 exhaust passage
3 three-way catalyst
4 filter
5 NOx storage reduction catalyst (NSR catalyst)
6 NOx selective reduction catalyst (SCR catalyst)
7 injection valve
8 intake passage
9 throttle valve
10 ECU
11 first temperature sensor
12 air fuel ratio sensor
13 second temperature sensor
14 NOx sensor 15 differential pressure sensor
16 air flow meter
17 accelerator pedal
18 accelerator opening sensor
19 crank position sensor

The invention claimed is:

1. An exhaust gas purification apparatus for an internal combustion engine comprising:
   a filter that is arranged in an exhaust passage of the internal combustion engine for trapping particulate matter contained in an exhaust gas;
   an NOx storage reduction catalyst that is arranged in the exhaust passage of the internal combustion engine, and serves to store NOx when an air fuel ratio of the exhaust gas is a lean air fuel ratio, and to reduce the NOx thus stored when the air fuel ratio of the exhaust gas is a rich air fuel ratio;
   an NOx selective reduction catalyst that is arranged in the exhaust passage at a location downstream of said NOx storage reduction catalyst, and serves to reduce the NOx by using $NH_3$ as a reducing agent;
   a regeneration unit that carries out regeneration of the filter to remove the particulate matter from said filter; and
   a control device that carries out rich control in which the air fuel ratio of the exhaust gas flowing into said NOx storage reduction catalyst is controlled to a rich air fuel ratio, at the time of supplying the reducing agent to said NOx storage reduction catalyst or said NOx selective reduction catalyst;
   wherein said control device makes the lowest value of the air fuel ratio of the exhaust gas at the time of carrying out said rich control in a predetermined period of time from a point in time at which the regeneration of said filter has ended, to be an air fuel ratio which is more suitable for generating $NH_3$ in said NOx storage reduction catalyst than for reducing NOx in said NOx storage reduction catalyst, and makes the lowest value or an average value of the air fuel ratio of the exhaust gas at the time of carrying out said rich control in a period of time from the lapse of said predetermined period of time until when the next regeneration of the filter is carried out, to be an air fuel ratio which is lower than the lowest value of the air fuel ratio of the exhaust gas at the time of carrying out said rich control in said predetermined period of time, and which is more suitable for reducing NOx in said NOx storage reduction catalyst than for generating $NH_3$ in said NOx storage reduction catalyst.

2. The exhaust gas purification apparatus for an internal combustion engine as set forth in claim 1, further comprising:
   a PM trap amount detection device that serves to detect an amount of the particulate matter trapped by said filter;
   said predetermined period of time is a period of time until the amount of the particulate matter detected by said PM trap amount detection device reaches a predetermined amount.

* * * * *